April 2, 1963 G. BERGSON 3,083,902
COMPUTER FOR TAKING SQUARES OF PLURALITY OF SUMS
Filed Aug. 2, 1961 2 Sheets-Sheet 1

INVENTOR.
GUSTAV BERGSON
BY Eugene M. Whitacre

April 2, 1963 G. BERGSON 3,083,902
COMPUTER FOR TAKING SQUARES OF PLURALITY OF SUMS
Filed Aug. 2, 1961

INVENTOR.
GUSTAV BERGSON
BY Eugene M. Whitacre

United States Patent Office 3,083,902
Patented Apr. 2, 1963

3,083,902
COMPUTER FOR TAKING SQUARES OF PLURALITY OF SUMS
Gustav Bergson, Jenkintown, Pa.
(250 Titus Ave., Warrington, Pa.)
Filed Aug. 2, 1961, Ser. No. 128,901
3 Claims. (Cl. 235—61)

This invention relates to computing devices. More particularly the invention relates to mechanical computers for performing such arithmetic or algebraic manipulations as adding, subtracting, squaring, deriving the square root or a desired combination of such manipulations.

It is often necessary in the laboratory or in industry to ascertain a quality or condition of a material or process, or the like, which is not readily obtained by direct measurement. In other words, the measurements which can be taken must be converted by mathematical manipulation to obtain the desired quality or condition. Where the mathematical manipulations are complicated or tedious, and a relatively large number of indications of the quality or condition are necessary, a computing device that materially lessens the labor involved and reduces the susceptibility of error is not only very desirable, but may become a necessity.

To facilitate a complete understanding of the invention, the explanation set forth hereinafter will be described in the environment of a color measuring system. However it will be apparent to those skilled in the art, that the principles of this invention may be extended to other applications.

Color measuring apparatus has heretofore been used in evaluating color differences for quality control in order to achieve more objective and more quantitative results than visual judgments afford. To be useful, the instrumental data must be correlated with visual experience. The dimensions of a color which are most readily visualized are its "lightness" (or position on a scale ranging from black through the dark and light colors to white), its "saturation" (or position on a scale which is perpendicular to the lightness scale and which ranges from neutral colors—white, gray or black—to the most vivid hues), and its "hue" (or position on a circular scale about the lightness scale wherein the circular scale ranges from red through orange, yellow, green, blue, purple, and back to red again). It is preferred for ease of computation to define color on the basis of a rectangular coordinate system having three mutually perpendicular axes corresponding to lightness, saturation and hue.

Unfortunately, color measuring instruments do not directly measure hue, saturation and lightness. They measure instead three color dimensions called C.I.E. (Commission Internationals de l'Eclairage) values, designated X, Y, and Z. These numbers theoretically represent the proportions of three standard primary colors which upon additive mixing will match the color being measured. In practice they are the relative reflectances to the red, green and blue light components of a light source having a specified spectral composition.

Numerous proposals have been made to solve the problem of converting the instrumental readings into the coordinates of a subjectively uniform color-space. One method of obtaining the coordinates of a visually uniform color space is to convert the instrumental readings by means of special tables. The lightness coordinate, L, is then plotted along the vertical axis, and the other two coordinates, $a$ and $b$ are a measure of the redness-greeness, and blueness-yellowness, respectively. The units of the dimensions of the respective coordinates have been adjusted by the tablets so that visually equal differences in any dimension correspond to equal numerical differences; that is, one unit difference in L looks to be as big a difference as one unit difference in $a$ or $b$. The unit used is approximately equal to the National Bureau of Standards (N.B.S.) unit of color difference whose magnitude was originally chosen to be about equal to the smallest color difference of commercial significance. The smallest difference that can be seen by a trained observer under ideal lighting conditions is approximately 0.3 N.B.S. unit.

Specifically, to determine the color difference of a material under test with respect to a reference sample, the color instrument is used to obtain the reflectance of three primary colors, in this case R, G, and B (red, green, and blue) from the material under test. The first step is to obtain a unit referred to as R' which is equal to $R + \frac{1}{4}B$. The next step is to refer to the tables and opposite the G reading, find the value of L and also a unit referred to as $a_G$ and $b_G$. Again referring to the tables opposite the computed value of R' the value of $a_{R'}$ is determined and opposite the B reading, the value of $b_B$ is found. The next step is to subtract the indicated value of $a_G$ from $a_{R'}$ to obtain one of the coordinates $a$. After this, the indicated value of $b_B$ is subtracted from $b_G$ to obtain another coordinate $b$. The total color difference may then be calculated by subtracting the final values of L, $a$ and $b$ from the similarly computed values of the sample. The total color differences is then equal to:

$$E = \sqrt{\Delta L^2 + \Delta a^2 + \Delta b^2}$$

It can be seen from the foregoing that the large numbers of numerical and mathematical manipulations if done by hand, increase the opportunity for error, and limit the use of the apparatus to highly skilled individuals.

It is accordingly an object of this invention to provide an improved computer for calculating color differences of a given material from a reference sample directly from tristimulus color indications.

It is a further object of this invention to provide an improved mechanical computer which is easily operated to indicate the sum of two quantities, A and B, where one or both of the quantities are multiplied by a constant, $k$.

It is a further object of this invention to provide an improved mechanical computer for computing the square root of the sum of the squares of a plurality of numbers.

Another object of this invention is to provide a simple and compact mechanical computer for performing such manipulations as adding, subtracting, squaring, deriving the square root or a combination of these manipulations.

Still another object of this invention is to provide an improved computing device in which the values of the R, G, and B readings of the color measuring instrument are set on appropriately designed scales, and the color difference of a material being measured from a reference sample may be read directly in N.B.S. units on an indicating scale.

In accordance with one aspect of the invention, addition or subtraction of two quantities may be effected by providing three calibrated scales which are slidable in side by side relation beneath a reference or indicating line. The three scales are connected together by a link member so that the position of two of the scales determines the position of the third. If the quantities to be added are the two outside scales, the center scale is calibrated to read twice as much per unit length as the outside scales. For addition the units of all the scales increase in the same direction. For subtraction the units of one of the outside scales increases when read from bottom to top whereas the units of the other scale increase in the opposite direction.

For calculating the square root of the sum of the squares of a plurality of numbers, the computer is provided with a corresponding plurality of setting scales. The setting scales are positioned in side by side relation, and are movable with respect to the reference line. Each of the setting scales is attached to or otherwise controls a different one of a number of members each of which has an edge or surface that defines a parabolic curve having the general formula $y^2=4ax$. The different members are affixed to the respective setting scales so that the origins of the parabolic edges or surfaces are in transverse alignment when the setting scales are set at zero or some other reference setting.

A transversely movable locator is mechanically interlinked with the parabolic edges of the various members so that its transverse location is a function of the settings of the various scales. More specifically the movement from zero (or some reference number) under the reference line of one of the setting scales, moves its associated member's parabolic edge or surface in the direction of the "$y$" axis thereof. This results in a displacement of the locator along the "$x$" axis by an amount proportional to the square of the distance that the scale was moved. The movement of the other setting scales cause similar displacement of the locator so that its resultant displacement is proportional to the sum of the squares of the various settings.

A slidable indicating scale for indicating the square root of the sum of the squares also controls a member having an edge or a surface which defines a parabola having the general formula $y^2=4ax$. The position of the member and indicating scale is limited by the locator. Since the position of the indicating scale is a function of the transverse position of the locator or a function of "$x$," the indication under the reference line "$y$" is proportional to the square root of the position of the locator "$x$." As mentioned above, the position of the locator is proportional to the sum of the squares of the setting of the slideable setting scales and accordingly the indication under the reference line is proportional to the square root of the sum of the squares.

If it is desired to have one or more of the setting scales expanded or contracted by a factor ($n$) relative to the other scales, then the member affixed to such scale must have its parabolic surface or edge correspond to the formula $y^2=4an^2x$.

The novel features that are characteristic of this invention as well as additional objects and advantages thereof will best be understood from the following drawings in which.

Figure 1:
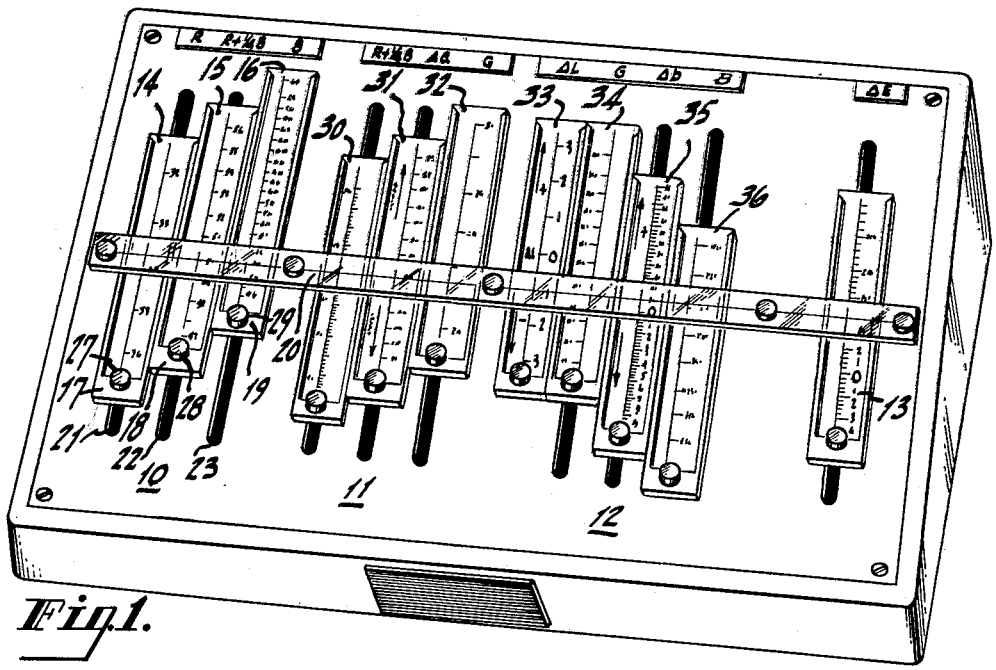
FIGURE 1 is a perspective view of a computing device for calculating the color difference of a material from a reference sample in N.B.S. units from R, B and G readings of a color measuring instrument.

Referring now to the drawings wherein like reference numerals will be used to indicate like elements throughout, and particularly to FIGURE 1, the computing device includes three groups of settings scales 10, 11 and 12 and an indicating scale 13. As mentioned above, the red, green and blue reflectance readings of a color measuring instrument are converted into quantities representative of the coordinates of a visually uniform color space, in order to identify the color, or to determine the difference of a color being measured from a given reference sample. Also as mentioned above, special tables are used to make the desired conversion. Certain of the scales of the computer are calculated from these tables, which are referred to as Adams Coordinate Tables of Glasser and Troy. The computer is set up to enable a direct color difference reading of a color under test from the reference sample, the color difference reading being in N.B.S. units.

The coordinates of the visually uniform color space are: $a$ which is on the green-red axis, $b$ which is on the blue-yellow axis, and L which is the lightness or brightness. To calculate the difference of a color under test from that of a reference sample, the difference of the $a$, $b$ and L readings of the color under test from that of the sample are determined, and then the total color difference in N.B.S. units is equal to the square root of the sum of the squares of $\Delta a$, $\Delta b$, and $\Delta L$.

To determine the dimension $a$, the R and B readings of a color measuring instrument must be first converted into a quantity R', wherein $R'=R+\frac{1}{4}B$. This manipulation may be done on the first group 10 of setting scales. The setting scales 14, 15 and 16 are held in slidable scale card holders 17, 18 and 19 respectively. The scale 14 is moved until the R reading of the color measuring instrument appears under an indicating line 20 that extends transversely across the computer. The scale 16 is moved until the B reading of the color measuring instrument appears under the indicating line 20, and the quantity $R+\frac{1}{4}B$ or R' appears on the center scale 15 under the indicating line.

The card holders 17, 18 and 19 are retained on the computer console surface in a manner to be slidable back and forth in three parallel slots 21, 22 and 23 respectively. The card holders are interlinked by a link member 24 which is pivotally fixed to the center card holder 18, and slidably and pivotally affixed to the card holders 17 and 19 by virtue of the elongated slots 25 and 26 in the opposite ends of the link. Thus, if the card holder 17 is moved from the position shown a distance, $x$, and the card holder 19 is not moved, the card holder 18 will be moved a distance equal to $x/2$. If the card holder 19 is then moved a distance $x$, the card holder 18 will be moved a total distance $x$. Thus, by calibrating the center scale 15 to increase at twice the rate as the outside scales, addition or subtraction may be performed. In the present instance addition is performed because all of the scales are increasing when read from bottom to top.

In order to add $R+\frac{1}{4}B$, the B scale 16 is contracted as compared to the R scale 14 by a factor of 4. Thus the R scale 14 moves 4 times as far from one unit to the next as does the B scale 16. As mentioned above the scale 15 is contracted by a factor of 2 as compared to the R scale 14.

Linearily calibrated scales are cut from card strips so that the R, B and $R+\frac{1}{4}B$ values of the reference sample to be matched are located in the center of the respective holders. After locating the R card in the card holder 17, the $R+\frac{1}{4}B$ card in the card holder 18, and the B card in the card holder 19, in each case with the readings increasing toward the top, they are centered so that the R, $R+\frac{1}{4}B$ and B values for the reference sample are lined up under the indicating line 20. The cards are then clamped in position by the clamping nuts 27, 28 and 29 on the respective card holders.

After the reading $R+\frac{1}{4}B$ or (R') has been obtained, the dimension $\Delta a$ may be determined by the second group of scales 11. The $\Delta a$ reading is the amount the color being measured is more green or more red than the reference sample. Heretofore $\Delta a$ has been calculated by referring to the Adams Coordinate Tables of Glasser and Troy and finding opposite the R' value the value of $a_{R'}$ and finding opposite the G reading (obtained by the color measuring instrument) the value of $a_G$. Next $a_G$ is subtracted from $a_{R'}$ to determine $a$, the $\Delta a$ is the amount that $a$ for the color being measured differs from that of the reference sample.

On the computer these manipulations are conveniently accomplished by setting the $R+\frac{1}{4}B$ reading on the scale 30 under the indicating line 20, and the G reading on the scale 32 under the line 20. The $\Delta a$ reading then appears on the scale 31 directly under the line 20.

The card holders for the scales 30, 31 and 32 are interlinked in the same manner as the holders 17, 18 and 19. However the scales 30, 31 and 32 are arranged for subtraction, that is, the scale 30 has increasing readings from bottom to top whereas the scale 32 has decreasing readings from bottom to top. The scales 30 and 32 are nonlinear in that they are calibrated from the Adams Coordinate Tables of Glasser and Troy. The scale 30 is calibrated so that the distance between one unit and the next is proportional to the difference in $a_{R'}$ (N.B.S. units) between these units. In like manner the scale 32 is calibrated so that the distance between successive G units is proportional to the difference in $a_G$ (N.B.S. units) between successive G units as found in the tables. The center scale 31 is calibrated to read directly $\Delta a$ in N.B.S. units, and has twice as many $a$ units for a given length as the scales 30 and 32.

The $R+\frac{1}{4}B$ scale calibrated in accordance with the tables, is positioned in its holder so that the $R+\frac{1}{4}B$ value of the reference sample appears in the center of the card. The G scale also calibrated from the tables is positioned in its holder so that the G value of the reference sample is approximately centered. The $\Delta a$ scale is a linear scale calibrated to read zero at the center thereof with numerical units increasing in both directions therefrom. With $\Delta a$ set at zero under the indicator line, the scales 30 and 32 are set at the $R+\frac{1}{4}B$ and G readings of the reference color sample respectively and clamped by the thumb nuts. If the $R+\frac{1}{4}B$ and G readings of the color being measured differ from those of the reference sample, the amount of this difference in N.B.S. units is indicated in the scale 31. If the $\Delta a$ reading on the scale 31 is above the zero then the color being measured has too much red. If the reading is below zero then there is too much green.

The third group of scales 12 is for determining the dimensions $\Delta L$ and $\Delta b$. The $\Delta L$ reading is the amount that the color being measured is lighter or darker than the reference sample, and the $\Delta b$ reading is the amount that the color being measured is more yellow or more blue than the reference sample. Heretofore, $\Delta L$ has been determined by referring to the subject tables and finding L opposite the G reading for the color being measured, and subtracting L for the color being measured from that of the reference sample. The $\Delta b$ reading is obtained by finding the value $b_G$ opposite the G reading in the tables, and the $b_B$ value opposite the B reading in the tables. The $b_B$ value is then subtracted from $b_G$. $\Delta b$ is then equal to the difference between the $b$ value for the color being measured, and that of the reference sample.

These manipulations are accomplished in a simple manner on the four scales 33, 34, 35 and 36 of the third group of scales 12. The scale 34 is set so that the G reading is registered under the indicating line 20, and then the B reading is on the scale 36 is set under the indicating line 20. The $\Delta L$ reading then appears under the indicating line 20 on the scale 33, and the $\Delta b$ reading appears under the indicating line on the scale 35. Actually the scales 33 and 34 are ganged to move together, as an integral unit, and the scale 34 is calibrated with respect to the linear scale 33 in accordance with the tables so that the $\Delta L$ readings on the scale 33 are directly opposite the corresponding G readings on the scale 34.

The scales 34, 35 and 36 are interlinked in the same manner as the scales in the first two groups 10 and 11. These scales are arranged for subtraction so the scale 34 has increasing readings from the bottom to the top whereas the scale 36 has decreasing readings from the bottom to the top. The scales 34 and 36 are nonlinear and are calculated from the Adams Coordinate Tables of Glasser and Troy in the same manner as scales 30 and 32.

The G and B scales 34 and 36 are positioned in their respective holders so that the G and B values of the reference sample appear at the centers of these scales. The $\Delta b$ and $\Delta L$ scales 33 and 35 are linear, and are calibrated to read zero at the center thereof with numerical units (N.B.S. unit) increasing in both directions from zero. If the $\Delta b$ reading on the scale 35 is above zero then the color being measured has too much yellow. If the reading is below zero then there is too much blue. The scales 33 and 34 are adjusted so that the zero reading in the $\Delta L$ scale 33 is opposite the G value of the reference sample on the scale 34. With the G scale 34 reading of the reference sample under the indicating line 20 and the $\Delta b$ scale 35 set so that its zero value is under the line, the B scale 36 reading for the reference sample is placed under the line 20.

As mentioned above, once the $\Delta a$, $\Delta b$ and $\Delta L$ values are obtained, the total color difference, $\Delta E$, of the color being measured from the reference sample is determined by finding the square root of the sum of the squares of $\Delta a$, $\Delta b$ and $\Delta L$. With the computer set to the desired $\Delta a$, $\Delta b$ and $\Delta L$ values $\Delta E$ may be conveniently determined by pushing up the indicating scale 13 until it is stopped. The color difference $\Delta E$ in N.B.S. units then appears on the indicating scale 13 under the indicating line.

Figure 2:
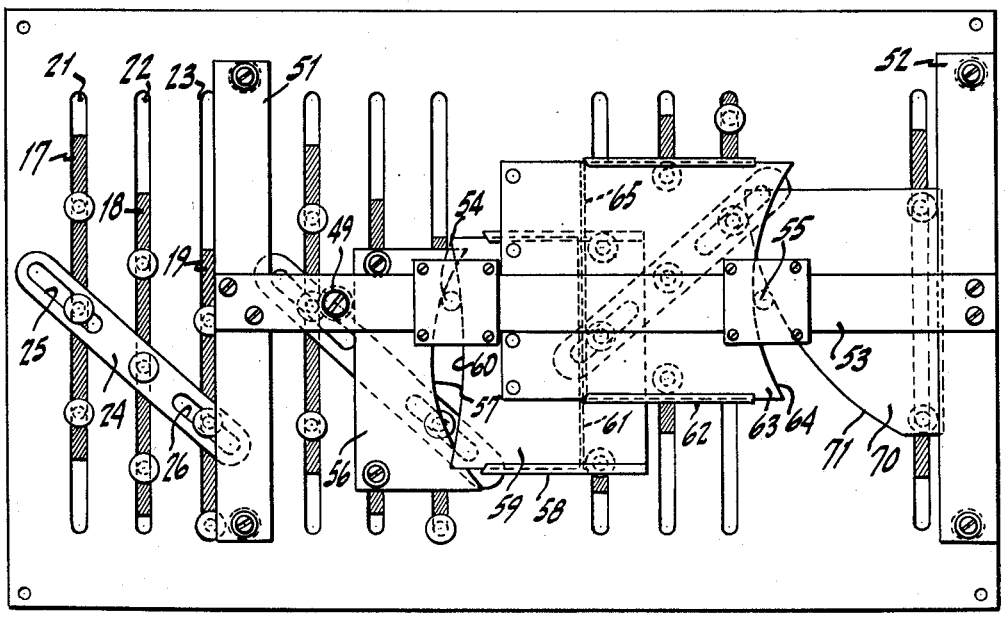
FIGURE 2 is a bottom view of the operating mechanism of the computing device removed from its cabinet.
Figure 3:
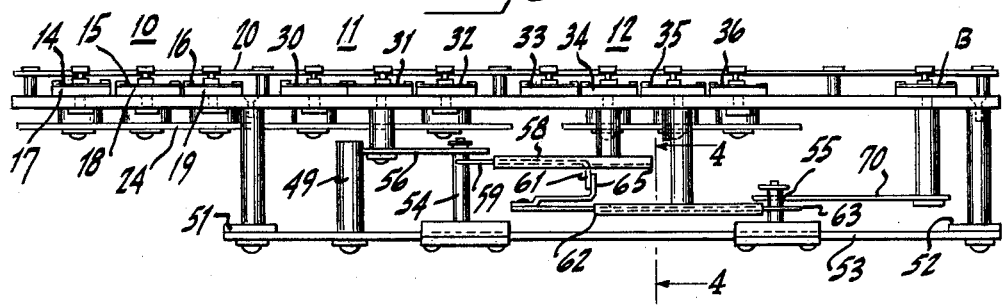
FIGURE 3 is a side view of the computing device removed from its cabinet.
Figure 4:
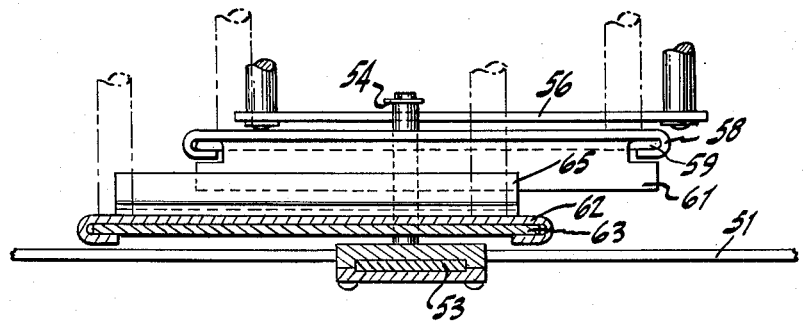
FIGURE 4 is an enlarged sectional view of a portion of the mechanism of the computing device taken on the section lines 4—4 of FIGURE 3.

The mechanism for producing the desired $\Delta E$ value will be best understood by reference to FIGURES 2 to 4. A pair of brackets 51 and 52 are mounted in spaced relation on the bottom of the console of the computer. A transverse crossbar 53 is mounted between the brackets 51 and 52, and mounted for sliding relation along the crossbar 53 are a pair of locator members 54 and 55, which project upwardly from the crossbar 53 toward the console of the computer.

A plate 56 is attached to, but spaced from the card carrier for the $\Delta a$ scale 31. One edge of the plate 56 rides against a stud 49 mounted on the crossbar 53. The opposite edge 57 of the plate is formed to define a parabolic curve having the general formula $y^2=4ax$. The edge 57 of the plate 56 engages the locator member 54 so that the sliding movement of the $\Delta a$ scale can cause transverse movement of the locator 54. The sliding movement of the $a$ scale corresponds to "$y$" in the general formula for a parabola and the transverse movement of the locator 54 corresponds to "$x$" in that formula. Thus, the amount that the locator 54 is displaced as a function of movement of the $a$ scale is proportional to $y^2$ or $(\Delta a)^2$.

A carrier 58 is attached to, but spaced from the card carrier for the G scale 34 to which the $\Delta L$ scale is attached. A second plate 59 is supported by the carrier 58 for sliding movement parallel to the axis of the crossbar 53. The second plate 59 has an edge 60 that is also shaped to define a parabolic curve. The edge 60 engages the locator member 54 so that sliding movement of the $\Delta L$ scale (and G scale) causes the second plate member 59 to be displaced laterally because of its engagement with the locator member 54 which is held in position by the plate 56. The edge of the second plate 59 opposite the shaped edge 60 is bent downwardly to provide a stop 61. As the $\Delta L$ scale is moved up or down, the second plate 59 is displaced as a function of $(\Delta L)^2$.

A second carrier 62 is attached to, but spaced from the card carrier for the $\Delta b$ scale 35. A third plate 63 is supported on the carrier 62 for sliding movement parallel to the axis of the crossbar 53. The third plate 63 also has an edge 64 that is shaped to define a parabola. An upstanding stop 65 is affixed to the opposite edge of the third plate 63, and engages the stop 61 to prevent movement of the third plate 63 in the direction of the locator member 54. Sliding movement of the $\Delta b$ scale causes the locator 55 to be transversely displaced along the parabolic shaped edge 64. The displacement of the locator 55 is a function of $(\Delta b)^2$.

Summarizing: the transverse position of the locator 54 is a function of $\Delta a^2$; the position of the stop 61 is a function of $\Delta a^2 + \Delta L^2$; the position of the locator 55 is a function of $\Delta a^2 + \Delta L^2 + \Delta b^2$.

It will be seen from the drawings that the parabolic edge 60 is much flatter than the parabolic edges 57 and 64. The reason for this, is of course, due to the difference in value of the coefficient $a$ in the formula $y^2 = 4ax$. The coefficient $a$ is selected in conformity with the calibration of the respective $\Delta a$, $\Delta b$ and $\Delta L$ scales. Since the $\Delta a$ and $\Delta b$ scales have the same number of N.B.S. units calibration per unit of dimension, the coefficients $a$ for the parabolic edges 57 and 64 are the same. The $\Delta L$ scale however has been expanded to have a fewer number of N.B.S. units calibration per unit of dimension. Accordingly, the coefficient for the parabolic edge is made negative (because the curve is reversed with respect to the edges 57 and 64), and is made larger by a factor $n^2$, where $n$ is the amount that the $\Delta L$ scale 33 is expanded relative to the $\Delta a$ and $\Delta b$ scales 31 and 35 respectively.

To derive the square root of the sum of the squares, a fourth plate 70 is attached to but spaced from the card holder for the indicating scale 13. The plate 70 has an edge 71 that defines a parabolic curve. The amount the scale 13 can be moved before the edge 71 engages the locator 55 is proportional to the square root of "$x$" or the position of the locator 55. Since the position of the locator 55 is a function of the sum of the squares $(\Delta a^2 + \Delta b^2 + \Delta L^2)$ then the resultant position of the scale 13 is a function of the square root of the squares or $\sqrt{\Delta a^2 + \Delta b^2 + \Delta L^2}$.

Initially, with the various scales set so that R, $\Delta a$, $\Delta b$ and $\Delta L$ readings of zero are set under the indicating line 20, the $\Delta E$ scale is set to zero and clamped by the thumb nut in that position. The tristimulus settings for a color being measured may then be set on the various scales, and the color difference from the reference sample is indicated on the $\Delta E$ scale in N.B.S. units. The amount that the color being measured is more red or more green than the sample is indicated on the $\Delta a$ scale. The amount that the color being measured is more blue or more yellow than the reference sample is indicated on the $\Delta b$ scale. These readings are helpful in determining the quantity of pigments that should be added to bring the color being measured closer to that of the reference sample.

What is claimed is:

1. A computer for computing the square root of the sum of the squares of three quantities comprising a console having a working surface area defining three generally parallel slots, three scale members, one mounted over each slot on the top of said working surface, a first plate having a cam edge defined by the general formula of a parabola below said working surface, and affixed to a first of said scale members through a first of said slots, a first carrier member below said working surface and affixed to a second of said scale members through a second of said slots, a second carrier member below said working surface and affixed to a third of said scale members through a third of said slots, a cross bar member mounted to extend across said three slots and transverse to said first plate, a second plate supported by said first carrier in a manner to permit sliding movement in a direction generally parallel to the length of said cross bar, said second plate having a cam edge transverse to said cross bar and on the side of said second plate adjacent said first plate defined by the general formula for a parabola, a third plate supported by said second carrier in a manner to permit sliding movement in a direction generally parallel to the length of said cross bar, said third plate having a cam edge transverse to said cross bar and on the side of said third plate remote from said second plate, a first locator member mounted for sliding movement along said cross bar and having a portion extending into simultaneous engagement with the cam edges of said first and second plates to thereby determine the longitudinal position of said second plate along said cross bar, stop means on one of said second and third plates for limiting the longitudinal position of said third plate as a function of the position of said second plate, a locator member mounted for sliding movement along said cross bar and having a portion extending into engagement with the cam edge of said third plate whereby the position of said second locator member is proportional to the sum of the squares of the settings of said three scales, and indicator means including a fourth plate having a cam edge engaging said second locator member, the cam edge of said fourth plate defined by a parabolic curve.

2. A computer for computing the square root of the sum of the squares of three quantities comprising, a console having a working surface area, first, second and third movable scale members mounted in generally parallel relation on said working surface, said second scale being expanded by a factor "$n$" as compared to said first scale, and said third scale being expanded by a factor "$m$" as compared to said first scale, a slide bar mounted beneath said working surface and extending transversely to said three scale members, a first cam having an edge defined by the general formula $y^2 = 4ax$ affixed to said first scale member such that the $y$ axis is transverse to said slide bar, first and second carrier members below said working surface, and affixed respectively to said second and third scale members for movement therewith, a second cam having an edge defined by the general formula $y^2 = 4an^2x$ supported by said first carrier in a manner to enable sliding movement in a direction parallel to the length of said slide bar and such that the $y$ axis is transverse to said slide bar and such that said cam edge faces the cam edge of said first cam, a third cam having an edge defined by the general formula $y^2 = 4am^2x$ supported by said second carrier in a manner to enable sliding movement in a direction parallel to the length of said slide bar and such that the $y$ axis is transverse to said slide bar and such that said cam edge faces in the same direction as the cam edge of said first cam, a first locator member mounted for sliding movement along said slide bar and having a portion extending into simultaneous engagement with the cam edges of said first and second cams to thereby determine the longitudinal position of said second cam along said cross bar, stop means on one of said second and third cams for limiting the longitudinal position of said third cam as a function of the position of said second cam, a second locator member mounted for sliding movement along said slide bar and having a portion extending into engagement with the cam edge of said third cam whereby the position of said second locator member is proportional to the sum of the squares of the settings of said three scales, and means coupled to said locator member indicating a function of the sum of the squares of the settings of said three scales.

3. A computer comprising, a console having a working surface area, first, second and third scale members mounted for movement in generally parallel relation on said working surface, a slide bar mounted beneath said working surface and extending transversely to said three scale members, a first cam having an edge defined by a predetermined function of its $y$ axis with respect to its $x$ axis affixed to said first scale member such that the $y$ axis is transverse to said slide bar, first and second carrier members below said working surface, and affixed respectively to said second and third scale members for movement therewith, a second cam having an edge defined by a predetermined function of its $y$ axis with respect to its $x$ axis supported by said first carrier in a manner to enable sliding movement in a direction parallel to the length of said slide bar and such that the $y$ axis is transverse to said slide bar and such that the cam edge of said second cam faces the cam edge of said first cam, a third cam having an edge defined by a predetermined function of its $y$ axis with respect to its $x$ axis supported by said second carrier in a manner to enable sliding movement in a direction parallel to the length of said slide bar and such that the y axis is transverse to said slide bar and such that the cam edge of said third cam faces in the same direction as the cam edge of said first cam, a first locator member mounted for sliding movement along said slide bar and having a portion extending into simultaneous engagement with the cam edges of said first and second cams to thereby determine the longitudinal position of said second cam along said slide bar, stop means on one of said second and third cams for limiting the longitudinal position of said third cam as a function of the position of said second cam, a second locator member mounted for sliding movement along said slide bar and having a portion extending into engagement with the cam edge of said third cam whereby the position of said second locator member is proportional to the sum of the predetermined functions of the $y$ axis of said first, second and third cams, and means coupled to said second locator member indicating a function of said sum of the predetermined functions.

References Cited in the file of this patent
UNITED STATES PATENTS 2,444,549    Anderson _____ July 6, 1940